May 8, 1951 D. B. VANDEWATER 2,551,651
APPARATUS FOR PASTEURIZING AND THE LIKE
Filed Nov. 6, 1948 3 Sheets-Sheet 1
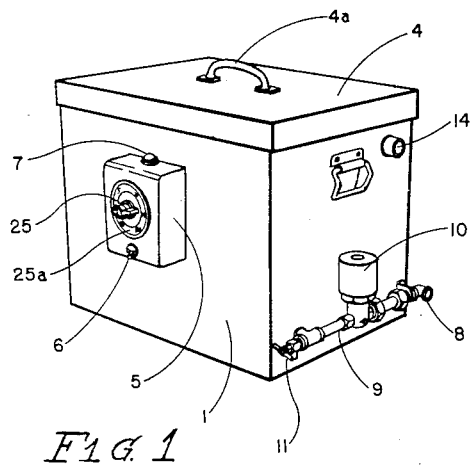
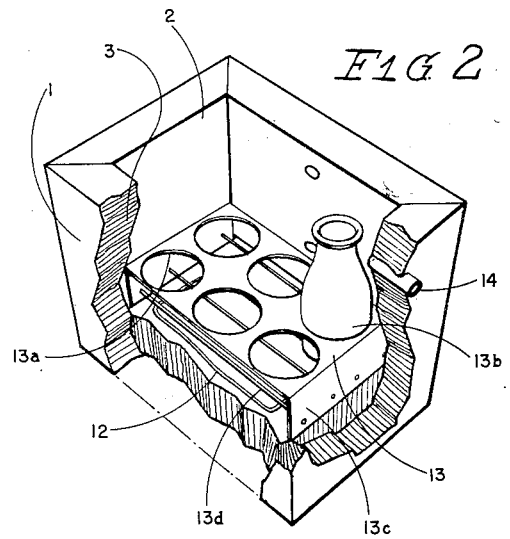
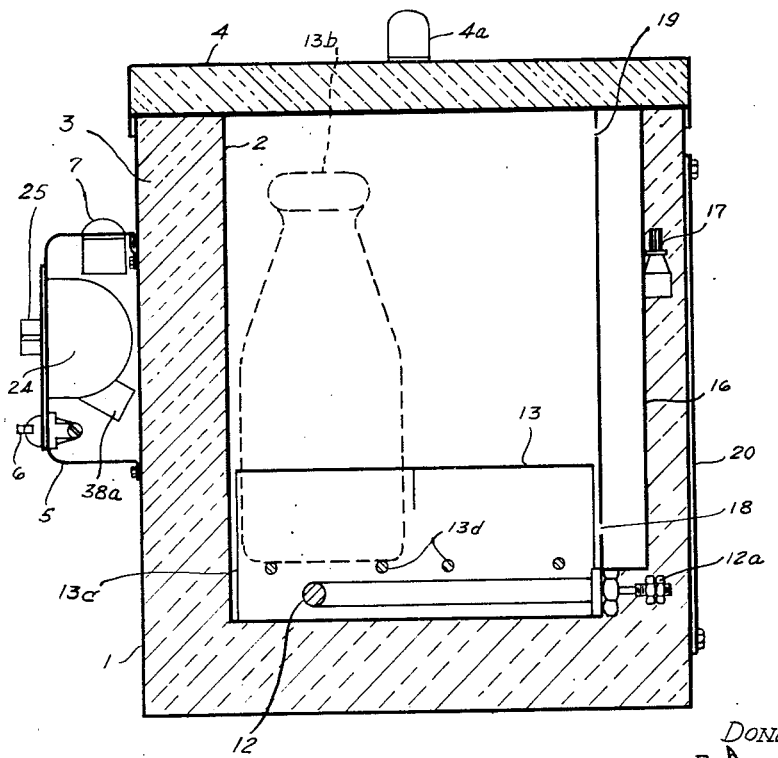
INVENTOR
DONALD B. VANDEWATER
BY Davis, Hoxie, & Faithfull
ATTORNEY May 8, 1951 D. B. VANDEWATER 2,551,651
APPARATUS FOR PASTEURIZING AND THE LIKE
Filed Nov. 6, 1948 3 Sheets-Sheet 2

INVENTOR
DONALD B. VANDEWATER
BY Davis Hoxie & Faithfull
ATTORNEY

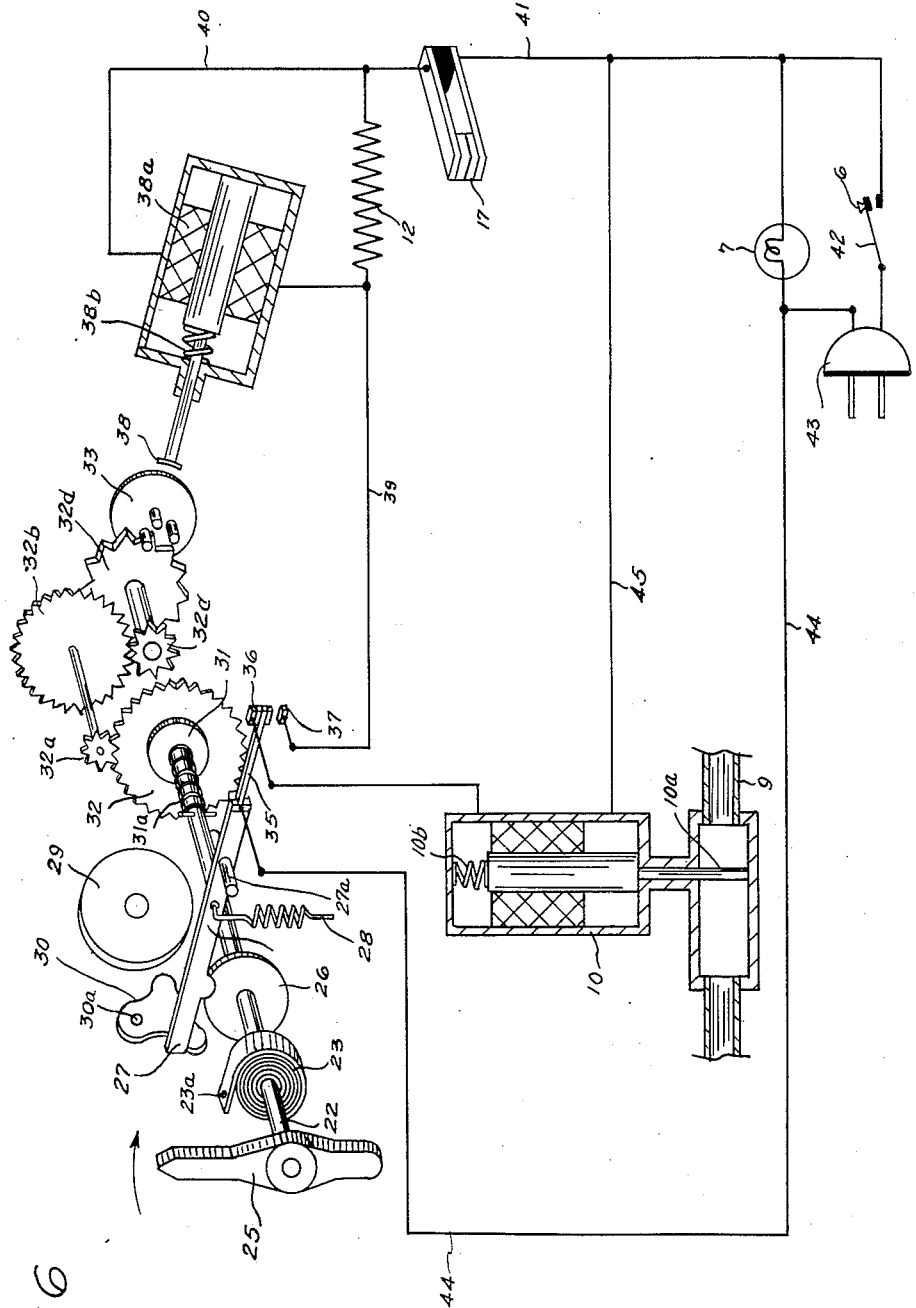

Patented May 8, 1951

2,551,651

UNITED STATES PATENT OFFICE 2,551,651

APPARATUS FOR PASTEURIZING AND THE LIKE

Donald B. Vandewater, Poughkeepsie, N. Y., assignor to The De Laval Separator Company, New York, N. Y., a corporation of New Jersey Application November 6, 1948, Serial No. 58,773

23 Claims. (Cl. 219—38)

This invention relates to apparatus for heat treating liquids by maintaining them above a selected temperature for a certain period of time. More particularly, the invention has reference to an improved apparatus of this character having features which make it especially suitable for pasteurizing milk, although the invention is not limited to such use.

One object of the present invention resides in the provision of a liquid heating apparatus which affords an indication when the milk or other liquid has been maintained above a certain temperature for a selected time interval, even though the liquid is not maintained continuously above such temperature.

Another object is to provide a liquid heating apparatus which automatically terminates the heating operation and initiates a cooling operation when the milk or other product has been maintained above a certain temperature, even though intermittently, for a selected total elapsed time.

A further object resides in the provision of a liquid heating apparatus of simple and compact form which is especially adapted for home use to pasteurize milk while in the bottle.

An additional object is to provide a liquid heating apparatus for milk pasteurizing, and the like, which is largely automatic in operation although inexpensive, whereby it can be used in the home with a minimum of attention.

Still another object is to provide a pasteurizer in which the temperature control is effected automatically and substantially in accordance with the thermal conditions existing in a sealed bottle containing the liquid to be pasteurized.

A liquid heating apparatus made according to the invention comprises a timer which, when it has been set for a predetermined time interval and the liquid is being heated, is held against operation by means of a holding device. When the liquid is heated to the necessary temperature, a thermostat acts to de-energize the heating element and withdraw the holding device, so that the timer commences to operate. If the liquid temperature becomes too low before expiration of the time interval, the thermostat re-energizes the heater and resets the holding device to interrupt the timer operation until the necessary temperature is restored, whereupon the timer operation is continued. When the timer completes its operation, it disconnects the heating element, and at the same time it may operate a valve to initiate a cooling operation.

In the pasteurization of milk, one method is to heat the milk to a temperature of 142°–143° F. and hold it at that temperature for thirty minutes, after which the milk is cooled as quickly as possible to prevent formation of "cream plugs," which are particularly objectionable in milk to be used for drinking purposes. With the new apparatus, the above described method of pasteurization can be practiced while the milk is in bottles. The bottles are simply placed in a bottle rack mounted within a tank which is open at the top. The tank is filled with water from a convenient source, and the water is heated by a heating element in the lower part of the tank. After the bottled milk has been heated in the water bath to the prescribed temperature, and has been maintained at that temperature for the proper length of time, the heating element is turned off and cold water is circulated through the tank. When the milk has been cooled by the running water, the bottles may be placed in a refrigerator until the milk is to be used.

Another feature of the apparatus, in its preferred form as an "in-the-bottle" pasteurizer, resides in the arrangement for controlling the transmission of heat to the milk in the bottles and to the thermostat. The rack in the pasteurizing tank serves not only to position the milk bottles but also to block off the free flow of convection currents in the water from the lower portion of the tank containing the heater to the upper part above the rack. The resulting thermal conditions in the bottled milk are substantially duplicated in a pilot tank separate from the main tank but communicating therewith through a common heat-conducting wall. The thermostat is positioned to receive heat directly from the water in the pilot tank and therefore responds to temperature changes similar to those occurring in the bottled milk being pasteurized. In this way, excessive heating and cooling of the milk, during the pasteurizing, are prevented.

The accompanying drawings show by way of example a preferred form of the new apparatus. In the drawings Fig. 1 is a perspective view of the apparatus;

Fig. 2 is a similar view but with the cover removed and parts broken away to show the interior;

Fig. 5 is a vertical sectional view on the line 5—5 in Fig. 4, and

Fig. 6 is a schematic view of the control mechanism and electrical connections.

Figure 4:
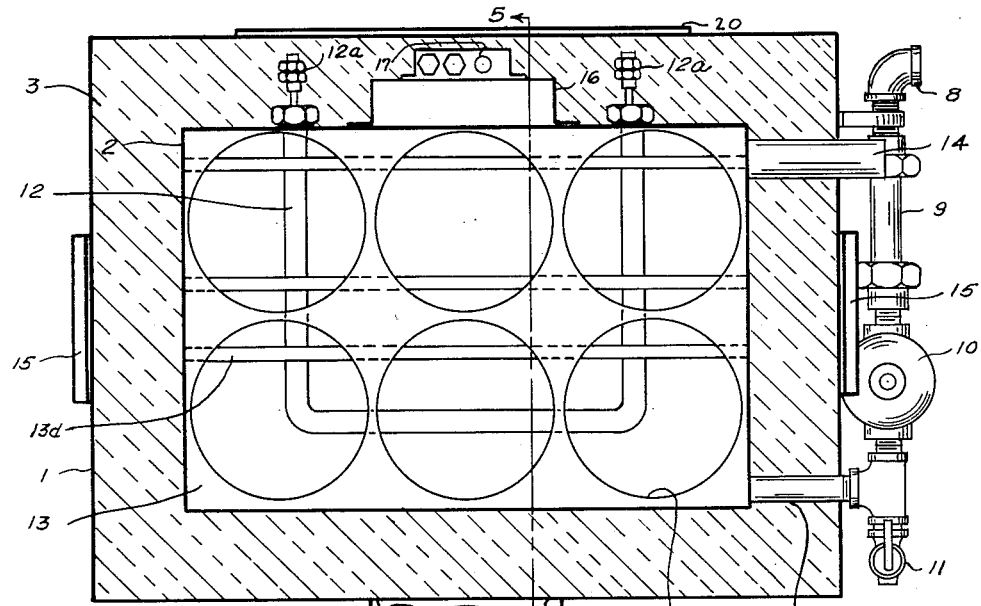
Fig. 4 is a horizontal sectional view on the line 4—4 in Fig. 3, with the top of the control casing broken away to reveal the interior.

Referring to the drawings, the pasteurizer has an outer casing 1 in which a tank 2 is supported in spaced relation to the casing. A layer of heat insulating material 3 is packed in the space between the tank and casing (Figs. 1 and 2). A cover 4 is provided with a handle 4a and contains heat insulating material. Affixed to the front of the casing 1 is a sub-casing 5 containing a timer, to be described presently. Mounted on the sub-casing is a switch handle 6 for controlling electrical connections, and a pilot lamp or signalling device 7 whereby a visual indication is given when the apparatus is in operation. At one side of the casing, a connection 8 is provided to supply water to the pasteurizer water line 9. Interposed in the water line 9 is a solenoid operated valve 10 and a drain cock 11. Within the tank 2 and slightly above the bottom thereof, an electric heater 12 is arranged. Also within tank 2 is a removable bottle rack 13 having holes 13a for receiving milk bottles 13b and having downwardly extending flanges 13c resting on and supported by the bottom of tank 2. A plurality of small rods 13d extends between flanges 13c below the perforated top of the rack 13 and serves to support the bottles 13b above and out of contact with the heater 12. An overflow pipe 14 extends from the upper portion of tank 2 through insulation 3 and casing 1 and serves to maintain the water level within the tank at a height just below the top of bottles 13b. Handles 15 are provided in order that the pasteurizer may be conveniently carried.

A pasteurizing medium pilot tank 16 is arranged directly in back of tank 2 and within the insulation between tank 2 and casing 3, as will be seen in Figs. 4 and 5. At a point somewhat nearer the top than bottom of the tank 16 and on the exterior thereof, a thermostatically operated electric switch 17 of the contact type is mounted. A fluid inlet to the interior of the pilot tank 16 from tank 2 is provided by a single small opening 18 near the bottom thereof, and a vapor pressure relief for the pilot chamber is provided by holes 19 located above the level of overflow pipe 14 and communicating with the interior of tank 2. Access to the heater terminals 12a and the thermostat switch 17 is accomplished by the removal of rear cover plate 20 which forms part of the casing 1.

Figure 3:
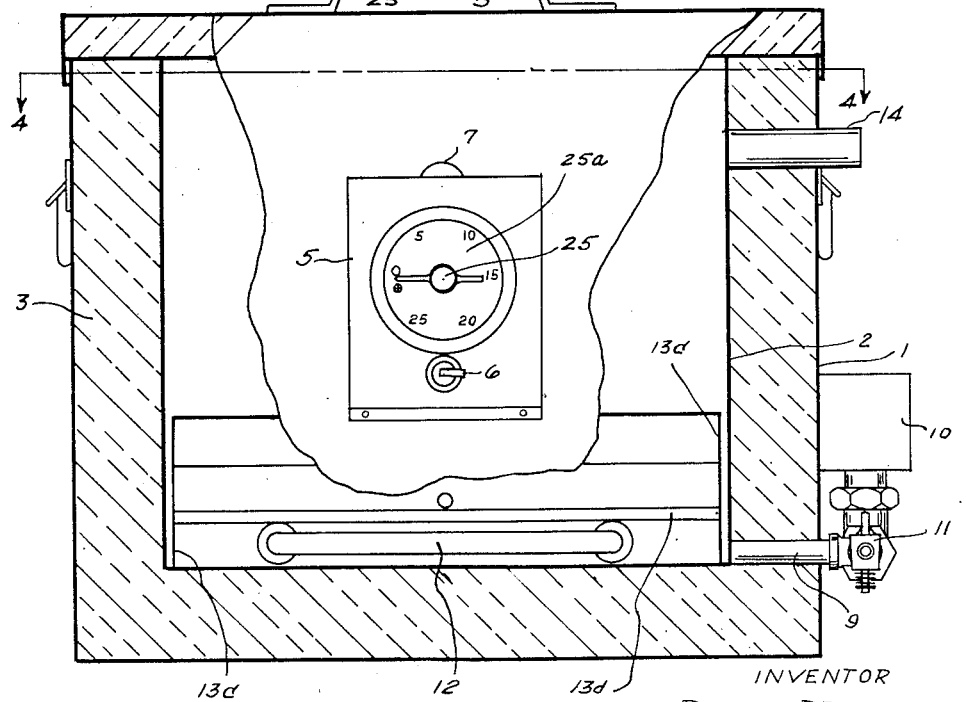
Fig. 3 is a vertical sectional view, partly in front elevation, of the apparatus.

The pasteurizing control mechanism is arranged in the sub-casing 5 to avoid damage from water or air-borne dust. The mechanism includes time and temperature controls, which are illustrated schematically in Fig. 6. As there shown, the timer mechanism comprises a shaft 22 rotatable by a spiral spring 23 having one end affixed to the shaft and the other end 23a to the housing 24 (Figs. 4 and 5) for the timer mechanism. The shaft 22 projects outwardly through the front of sub-casing 5 and carries at its front end a combination elapsed time indicator and operating handle 25. The latter coacts with a dial face 25a on the sub-casing, to indicate the time setting. Secured to shaft 22 is a cam wheel 26 engaging a cam follower 27 which is pivoted at 27a and held against cam 26 by a spring 28. A bell 29 is mounted adjacent the shaft and is engageable by a clapper 30 pivoted at 30a. A friction clutch 31, splined on shaft 22, is urged by a spring 31a against a spur gear 32 rotatable relative to the shaft. The gear 32, through its associated gear train 32a, 32b, 32c and 32d, operates an escapement mechanism 33. In the operation of the timer, the indicator-handle 25 is turned to the desired elapsed time mark on the dial face 25a (Figs. 1 and 3). As the handle is turned, spring 23 is wound and the cam follower 27 is lifted from its lowered position, shown in Fig. 6, to the raised surface of the cam. Friction clutch 31 slips when it is turned rapidly by handle 25, but grips and drives the gear 31 when the shaft is rotated relatively slowly by spring 23. After the indicator-handle has been set at the desired elapsed time mark, the same is released, and the shaft 22 then begins to return to its original position under the influence of the wound spring 23 at a speed controlled by the escapement mechanism 33. At the conclusion of the time interval, cam 26 reaches its original position illustrated in Fig. 6, and follower 27 drops into the depressed portion of the cam. In so doing, clapper 30 is struck by the adjacent end of follower 27 and swings about its pivot 30a so as to ring the bell 29, thereby giving an audible indication that the preselected time interval has been completed.

Timer mechanisms of the single-revolution type, as illustrated, are well known in the art and are commonly used on cooking ranges, and the like. Such a timer, because of its simplicity, is well suited for use in the new pasteurizer when supplemented with the parts which will now be described.

On the end of follower 27 opposite the clapper 30 are metallic elements forming a switch contact 35 which, in the non-operating position of follower 27, engages a fixed contact 36. When follower 27 is raised by cam 26, the switch contact 35 moves from contact 36 to another fixed contact 37. A solenoid operated brake or holding device 38 is mounted adjacent the escapement mechanism 33, the brake solenoid 38a having one terminal connected through wire 39 to contact 37. The other terminal of solenoid 38a is connected through wire 40, thermostatic switch 17, wire 41 and manual switch 42, to one terminal of a plug 43, which may be inserted in any convenient electrical outlet as a current source. The other terminal of plug 43 is connected through wire 44 to switch contact 35. Fixed contact 36 is connected through solenoid valve 10 and wire 45 to the manual switch 42. The pilot lamp 7 is connected between wires 41 and 44, and the heater 12 is connected in parallel with brake solenoid 38a.

A source of running water is connected to coupling 8, as by means of a rubber hose, and similarly, a connection is made to the overflow pipe 14 to carry the discharge from the latter to a suitable drain. The bottles 13b containing the milk to be pasteurized are placed in rack 13 within tank 2, and the cover 4 is then replaced. With the plug 43 connected to the current source, as previously described, the apparatus is now ready for operation.

To start the pasteurizing cycle, the switch handle 6 is actuated to close switch 42, thereby energizing the winding of solenoid valve 10 through contacts 35 and 36. As a result, the gate 10a of the solenoid valve is opened against the action of spring 10b, so that water from inlet connection 8 flows through pipe 9 to the interior of tank 2. Pilot lamp 7, being connected across wires 41 and 44, is illuminated, thus giving a visual signal that the device is in operation. When tank 2 is filled to the proper liquid level, the excess will be discharged through overflow pipe 14.

Of course, if the water has not been drained from tank 2 via drain cock 11, after a previous use, this filling step will not be necessary.

After the tank 2 has been filled to the proper level, as determined by overflow pipe 14, the indicator-handle 25 of the timer mechanism is turned to the desired time marking on dial 25a, for example, to the 30 minute mark, and then released. As previously explained, movement of the handle 25 turns cam 26 and thereby displaces cam follower 27, breaking contacts 35 and 36 and making contacts 35 and 37. Thus, the circuit through solenoid valve 10 is broken, causing valve gate 10a to close so as to shut off the flow of water through pipe 9. At the same time, the brake solenoid 38a is energized through the thermostatic switch 17 and contacts 37, 35, with the result that the brake shoe 38 is pressed against spring 38b into engagement with the escapement mechanism 33, thus preventing operation of the timer.

The heater element 12 within tank 2, being connected in parallel with the brake solenoid 38a, is energized simultaneously therewith and heats the water in the tank. When the water in tank 2 and pilot tank 16 is heated to the temperature to which thermostatic switch 17 has been previously adjusted (for example, 146° F.), and slightly beyond the official pasteurization temperature (142°–143° F.), switch 17 opens and breaks the circuit through heating element 12 and brake solenoid 38a. The brake 38, under the influence of loading spring 38b, then releases the escapement mechanism 33 and permits the timing mechanism to start measuring the time interval previously selected by adjustment of handle 25. If at any time during the selected time interval, the temperature of the water or pasteurizing medium in tank 2 and pilot tank 16 drops to the preset low level of 142°–143° F., thermostatic switch 17 will close. Consequently, the heater element 12 and brake solenoid 38a will be reenergized, so as to supply additional heat and stop the timer operation until the temperature of the water in tank 2 has been raised to the upper temperature level (146° F.) for which the thermostatic switch 7 is preset.

At the conclusion of the selected time interval, cam 26 has returned to the position shown in Fig. 6. At this point, cam follower 27 drops into the depression in cam 26, striking clapper 30 which rings bell 29 and provides an audible signal that the timed interval has been completed. At the same time, movement of the cam follower 27 opens contacts 35 and 37 and closes contacts 35 and 36, thereby disconnecting heater 12 and brake solenoid 38a from the power line. Closure of contacts 35 and 36 again energizes solenoid valve 10 and thus allows water from inlet connection 8 to flow via pipe 9 through the interior of tank 2 and the overflow pipe 14. This flow of water is permitted for a sufficient time interval, say 10 or 15 minutes, to cool the milk from the relatively high pasteurizing temperature before placing the same in a refrigerator. When the bottles of milk have been cooled to the extent permitted by the temperature of the supply of running water available at inlet 8, the handle 6 is moved to open switch 42. This breaks the circuit through contacts 35, 36 and the solenoid valve 10, which, under the action of its loading spring 10b, shuts off the flow of water through pipe 9. Opening of switch 42 also extinguishes pilot lamp 7, which has remained energized during all of the time that switch 42 was closed, to indicate that the apparatus was in operation.

It is to be noted that the temperature control of the milk being pasteurized is effected through a pilot tank outside the main tank 2 but communicating therewith. Both tanks, however, are filled to the same level and contain the same medium for the transfer of heat from the heating element 12 to the bottled milk in the main tank and to the thermostat switch 17 in the pilot tank. It is to be noted further that free flow of the convection currents set up in the pasteurizing medium in the main tank by the heating element 12 is blocked off at a level about two inches above the bottom of the bottles by the bottle rack 13, while free flow of the convection currents in the pasteurizing medium in pilot tank 16 is unobstructed. The liquid medium in pilot tank 16 receives heat only by transfer through the common metal wall between tanks 2 and 16, and not directly from the heating element 12. Accordingly, the convection currents set up within the pilot tank 16 are similar to the convection currents set up in the milk contained in the individual milk bottles 13b.

In order to keep the temperature of a body of liquid uniform while it is being heated or cooled, it is accepted practice to agitate the liquid constantly. By the present invention, the problem of bringing a body of milk uniformly to an elevated temperature in a sealed container without agitation has been solved. That is, the new apparatus makes such agitation unnecessary by preventing free flow of convection currents in the pasteurizing medium in which the sealed containers are immersed, thereby checking wide temperature differences at the top and bottom levels of the milk in the sealed containers.

Referring now to Figs. 2, 4 and 5, it will be seen that the milk bottles 13b fit closely in the openings 13a in bottle rack 13, and that the sides 13c of the rack extend downwardly to the bottom of tank 2, forming a support for the rack. The horizontal face of the rack thus forms a barrier somewhat above the heater element 12 and the bottom of the bottles, whereby tank 2 is divided into upper and lower chambers. Convection currents set up by the heating element 12 are thus confined to the lower chamber and those parts of the bottles below the barrier. Milk in the lower portion of each bottle is quickly heated by conduction through the bottle wall and starts to rise to the top of the bottle, since there are no restrictions to convection currents within the bottle. The pasteurizing medium above the horizontal face of rack 13, in the upper chamber, is heated from the bottom only by conduction through the relatively negligible solid areas between the bottle openings 13a in the rack face. Accordingly, the temperature rise of that portion of the pasteurizing medium in the upper chamber is slow compared to the temperature rise within the sealed milk bottle. It will thus be apparent that as the milk is heated in the lower part of the bottle and starts to rise to the top, it is cooled somewhat by heat conduction (through that portion of the bottle wall above the rack 13) to the pasteurizing medium in the upper chamber. This heating and cooling of the milk within the bottle, utilizing heat transfer by convection currents within the bottle and by conduction through the bottle wall, actually results in an agitation of the body of milk comparable to the agitation obtained in prior devices by propellers or other moving parts.

By placing the pilot tank 16 outside the main tank 2 but in direct heat transfer relation thereto, the thermostatic switch 17 on the pilot tank is responsive to a medium which is subject to the same temperature changes as the milk within the sealed bottles. The temperature of the pasteurizing medium in the upper chamber of tank 2 will be approximately an average of the various temperature levels of the milk in the bottles within tank 2. As shown in Fig. 5, the pilot tank 16 is in direct heat transfer relation, by conduction, with both the upper and lower chambers of tank 2. Accordingly, the liquid in the lower portion of tank 16 is heated by conduction through the common wall from the lower part of tank 2, and the resulting convection currents set up within tank 16 tend to carry heated liquid to the top of the pilot tank. However, the relatively cold pasteurizing medium in the upper chamber of tank 2 tends, by conduction through the common wall, to cool the warm medium rising in tank 16. Thus, the liquid within pilot tank 16 is subjected to the same heating and cooling factors as the milk within the bottles 13b. The thermostatic switch 17, being in direct heat transfer relation to the liquid in the pilot tank, will therefore be responsive to temperature changes similar to those occurring in the bottled milk being pasteurized.

It will be apparent that the brake shoe 38 serves as a device for rendering the timer inoperative, and it has a connection with the thermostatic switch 17 through solenoid 38a and wire 40, whereby the braking device is operated to interrupt the timer when the liquid temperature becomes too low. The braking device 38 also has a connection with the heater through solenoid 38a and the wiring by which the heater is connected in parallel with the solenoid. Thus, the heater and braking device are operated simultaneously. The circuit including contacts 35, 37 constitutes a means under control of the thermostat for operating the heater and the braking device 38; and this circuit is in parallel with the circuit including the solenoid valve. The member 35, forming part of a two-position switch, serves as a means under control of the timer for rendering the heater and the braking device inoperative by the the thermostat while opening the valve 10a through its solenoid, that is, for selectively energizing the two circuits.

The switch 35—37 may be regarded as a master control connected to the heater 12 for operating it and actuable to render the heater inoperative. The thermostatic switch 17 may be regarded as a second control which is connected to both the heater 12 and the device 38 for operating the latter to stop the timer while rendering the heater operative.

I claim:

1. An apparatus of the character described comprising a heater, a master control connected to the heater for operating the same and actuatable to render the heater inoperative, a timer connected to the master control for actuating the same, a device operable to stop the timer, and a second control connected to both the heater and said device for rendering said device inoperative while rendering the heater inoperative.

2. An apparatus according to claim 1, in which said second control is a thermostat responsive to the heating effect of the heater.

3. An apparatus according to claim 1, comprising a tank for receiving a liquid, the heater being operable to heat the liquid, said second control being a thermostat responsive to temperature changes of the liquid and acting to operate the heater and said device when the liquid is below a predetermined temperature.

4. An apparatus of the character described, comprising a tank for receiving a liquid, a heater for the liquid, a timer, a device operatively connected to the heater for rendering the timer inoperative during operation of the heater, a valve for admitting said liquid to the tank, and a member under control of the timer for actuating the valve.

5. An apparatus of the character described comprising a tank for receiving a liquid, a heater for the liquid, a timer, a device operatively connected to the heater for rendering the timer inoperative during operation of the heater, a valve for admitting said liquid to the tank, and means for opening the valve while maintaining the heater inoperative.

6. An apparatus according to claim 5, in which said means are under control of the timer.

7. An apparatus of the character described comprising a tank for receiving a liquid, a heater for the liquid, a timer, a device operatively connected to the heater for rendering the timer inoperative during operation of the heater, a thermostat responsive to temperature changes of the liquid and acting to operate the heater when the liquid is below a predetermined temperature, a valve for admitting said liquid to the tank, and means under control of the timer for opening the valve while maintaining the heater inoperative by the thermostat.

8. An apparatus of the character described comprising a tank for receiving a liquid, a heater for the liquid, a timer, a device for rendering the timer inoperative, a thermostat responsive to temperature changes of the heated liquid, an operative connection between the thermostat and the heater for energizing and de-energizing the heater, and an operative connection between the heater and said device for operating the device to render the timer inoperative simultaneously with energizing of the heater.

9. An apparatus according to claim 8, comprising also a member under control of the timer for maintaining said device inoperative.

10. An apparatus according to claim 8, comprising also a valve for admitting said liquid to the tank, and a member under control of the timer for actuating the valve.

11. An apparatus according to claim 8, comprising also a valve for admitting said liquid to the tank, and means for opening the valve while maintaining the heater inoperative.

12. An apparatus according to claim 8, comprising also a valve for admitting said liquid to the tank, and means under control of the timer for opening the valve while maintaining the heater inoperative.

13. An apparatus of the character described comprising a tank for receiving a liquid, a horizontal rack in the tank spaced above the bottom thereof and having at least one opening for receiving a bottle, the rack dividing the tank into upper and lower chambers, a heater in the lower chamber, a pilot tank for receiving a liquid and having a heat conducting wall common to both tanks, a thermostat responsive to temperature changes of said last liquid, and means under control of the thermostat for operating the heater.

14. An apparatus according to claim 13, in which said heat conducting wall contacts the liquid in both chambers.

15. An apparatus according to claim 13, in which the pilot tank is of approximately the height of the first tank but is substantially unobstructed from top to bottom.

16. An apparatus according to claim 13, in which the pilot tank is of approximately the height of the first tank but is substantially unobstructed from top to bottom, the thermostat being located above the level of the rack and in direct heat transfer relation to the pilot tank.

17. An apparatus according to claim 13, comprising also an outer casing in which said first tank is supported, the pilot tank being disposed in a space between the first tank and said casing.

18. An apparatus according to claim 13, in which said common wall has an opening for flow of liquid between the tanks.

19. An apparatus according to claim 13, in which said common wall has a pair of openings for flow of liquid between the tanks, one opening above and the other below the level of the rack.

20. An apparatus of the character described comprising a tank for receiving a liquid, an electric heater for the liquid, a timer, an electrically operative device for rendering the timer inoperative, a thermostatic switch operative in response to temperature changes of the liquid, an operating circuit including said switch, heater and device, an electrically operable valve for admitting said liquid to the tank, a circuit including said valve and connected in parallel with said first circuit, and a switch for selectively energizing said circuits.

21. An apparatus of the character described comprising a tank for receiving a liquid, an electric heater for the liquid, a timer, an electrically operative device for rendering the timer inoperative, a thermostatic switch operative in response to temperature changes of the liquid, an operating circuit including said switch, heater and device, an electrically operable valve for admitting said liquid to the tank, a circuit including said valve and connected in parallel with said first circuit, and a switch under control of the timer for selectively energizing said circuits.

22. An apparatus of the character described comprising a tank for receiving a liquid, an electric heater for the liquid, a timer, an electrically operative device for rendering the timer inoperative, a thermostatic switch operative in response to temperature changes of the liquid, an operating circuit including said switch, heater and device, an electrically operable valve for admitting said liquid to the tank, a circuit including said valve and connected in parallel with said first circuit, a two-position switch for selectively energizing said circuits, and an electric signalling device connected to both circuits and operable in either position of said last switch.

23. An apparatus of the character described comprising a tank, a horizontal rack in the tank dividing the interior thereof into upper and lower chambers, the rack having at least one opening for receiving a bottle, a heater in said lower chamber, a valve for admitting liquid to the tank, a pilot tank communicating with said first tank and having a heat conducting wall common to both tanks, the pilot tank being of approximately the height of the first tank but substantially unobstructed from top to bottom, a thermostat responsive to temperature changes in the pilot tank, a timer, a device for rendering the timer inoperative, a connection between the thermostat and said device for operating the device when the liquid in the pilot tank is below a predetermined temperature, a connection between the thermostat and the heater for operating the heater simultaneously with said device, and means under control of the timer for opening the valve while maintaining the heater inoperative by the thermostat.

DONALD B. VANDEWATER.

REFERENCES CITED

The following references are of record in the file of this patent:

UNITED STATES PATENTS

| Number | Name | Date |
| --- | --- | --- |
| 1,437,005 | Newsom | Nov. 28, 1922 |
| 1,702,480 | Newsom | Feb. 19, 1929 |
| 2,088,728 | Stranszky | Aug. 3, 1937 |
| 2,279,196 | Herman | Apr. 7, 1942 |